Figure 1:
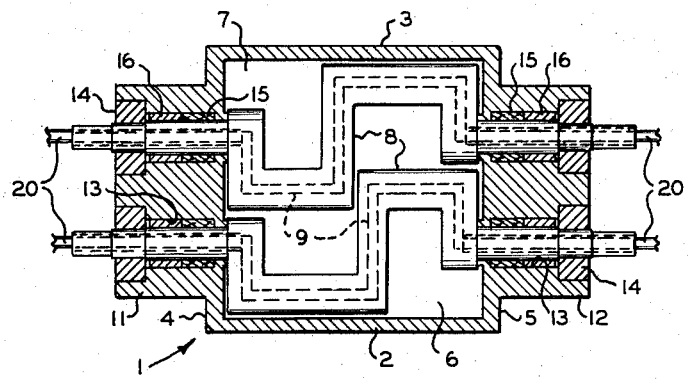

Aug. 17, 1965

R. J. BALAZER 3,200,880

MIXER CONSTRUCTION

Filed Feb. 11, 1963

INVENTOR.
RICHARD J. BALAZER
BY
*Leaman, Leaman & McCulloch*
ATTORNEYS 3,200,880
MIXER CONSTRUCTION
Richard J. Balazer, Saginaw, Mich., assignor to Baker Perkins Inc., Saginaw, Mich., a corporation of New York
Filed Feb. 11, 1963, Ser. No. 257,510
4 Claims. (Cl. 165—88)

This invention relates to mixer, kneader, or extruder constructions of the kind wherein a heat exchanging medium is circulated through the mixing blades for affecting, during mixing, the temperature of the substance being mixed. More particularly, the invention relates to apparatus for minimizing or eliminating the deleterious effects on bearings and packings and the like that otherwise would be encountered in the circulation of a fluid heat exchanging medium.

The mixing, kneading, or extrusion of certain kinds of substances is facilitated by circulating a fluid exchange medium, such as steam, through the mixing blades so as to heat the substances being mixed or kneaded. Similar treatment of other substances is facilitated by cooling the latter. In a construction wherein the blades or extruding rams or screws are mounted by bearings and packings, the delivery of steam to the blades often results in raising the temperature of the bearings above the critical temperature of the bearing lubricant, thereby resulting in failure of the bearings and breakdown of the machine. Packing glands also are heat sensitive and it has been found that the circulation of steam adjacent the packing glands has adversely affected the glands, necessitating their frequent replacement.

In order to counteract to some extent the adverse effects of circulating steam adjacent bearings and packing glands, it heretofore has been proposed to make use of special bearings and packing materials, special lubricants, or both. Such proposals have not been altogether successful for the reasons that they are unduly expensive and extremely sensitive. Furthermore, even special bearings, bearing lubricants, and packing materials in time become subject to failure from prolonged exposure to high temperatures.

In those instances where cooling of the blades, rams or screws is desirable, for example, to offset the heat generated by mixing or extruding, the flow of coolant through the blades and the like may cause condensation to form within the bearing, packing structure, or gear case. The condensate may mix with the lubricant and cause the latter to deteriorate, resulting in failure of the bearing or packing.

An object of this invention is to provide a thermally insulating construction for the bearings of cored mixer, extruder, or the like blades through which a heat exchanging medium is circulated.

Another object of the invention is to provide insulating apparatus of the kind referred to that not only protects the bearings, but also any packing glands that may be associated with the bearings.

A further object of the invention is to provide insulating apparatus for mixers, kneaders, or extruders of the character referred to which minimizes the loss of effectiveness of the fluid exchange medium, thereby improving the thermal efficiency of the mixing or kneading process.

Another object of the invention is to provide thermal insulating apparatus for use in connection with bearing and gland constructions for protecting lubricants and the like against contamination and deterioration from condensed moisture.

Figure 2:
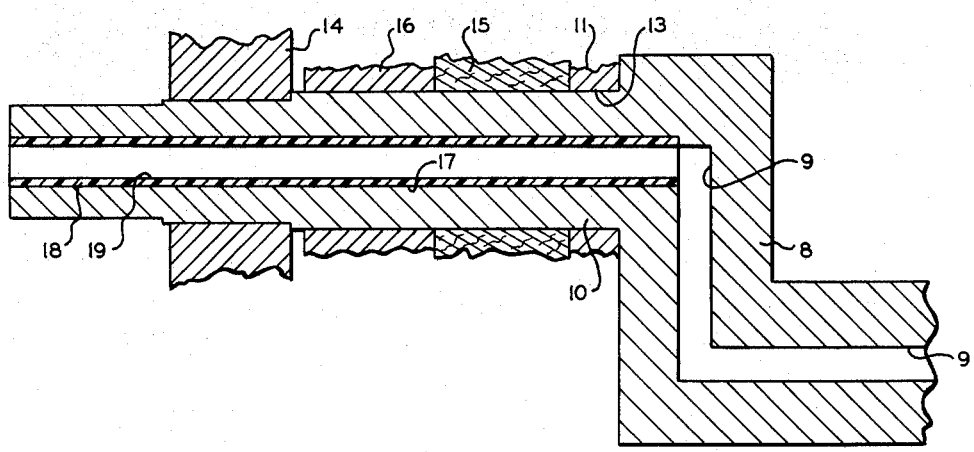

Other objects and advantages of the invention will be pointed out specifically or will become apparent from the following description when it is considered in conjunction with the appended claims and the accompanying drawings, in which:

FIGURE 1 is a plan sectional view through a typical mixer housing having a number of cored blades rotatably journaled in the housing and provided with means for circulating a heat exchange medium therethrough; and FIGURE 2 is a fragmentary, enlarged, sectional view illustrating a portion of one mixing blade and the details of its journaling and thermal insulating construction.

Apparatus constructed in accordance with the invention is adapted for use in conjunction with mixers, kneaders, or extruders, but for illustrative purposes the apparatus is disclosed as being incorporated in a sigma blade or other type mixer. The mixer includes a housing 1 composed of side walls 2 and 3, end walls 4 and 5, and a bottom wall 6, all of which are joined to one another to form a mixing chamber 7. Rotatably mounted in the mixer chamber are blades 8 of sigma or other suitable configuration. Each of the blades is cored to form a passage 9 extending therethrough from end to end to permit steam, water, refrigerant or other heat exchanging fluid to be circulated through the blade.

At opposite ends of each of the blades 8 is a shaft portion 10 that may be either integral with or suitably secured to the blade 8. The end walls 4 and 5 of the housing 1 are provided with extensions 11 and 12, respectively, each of which is provided with a plurality of openings 13 through which the shafts 10 extend. Gearing (not shown) may be mounted on each shaft to rotate the latter.

Each of the shaft accommodating openings 13 in the housing 1 is provided with a bearing 14 of any conventional construction by means of which the shafts are journaled for rotation. Surrounding each shaft inwardly of the bearing 14 is a packing or seal 15 of conventional construction and, if desired, a conventional packing back-up ring 16 may be interposed between the packing and the bearing.

As is best illustrated in FIGURE 2, each shaft 10 is provided with an axial bore 17 in communication with the passage 9. Fitted within the bore 17 is a thermal insulating plastic sleeve 18 that is open at both ends and has a wall thickness such that its bore 19 is substantially the same size as the diameter of the passage 9. The diameter of the shaft bore 17, therefore, should be larger than the diameter of the passage 9 by an amount corresponding to twice the wall thickness of the sleeve 18.

Tubes 20 may be fitted to the free end of each shaft 10 to deliver heat exchange fluid to and from the blades 8. Preferably, the heat exchange medium comprises steam, but other fluids such as water or refrigerants could be utilized.

The material from which the insulating sleeve 18 is formed preferably is a synthetic resin having high thermal insulating properties. Ploymers of tetrafluoroethylene, and particularly the polytetrofluoroethylene polymer known as Teflon, have been found to be satisfactory materials. Other synthetic materials having generally similar insulating properties may be used, however. For example, other thermosetting plastics capable of withstanding temperatures of 500° F. or possibly ceramic sleeves may be utilized. Such materials have a low U factor where U is the B.t.u. per square foot per hour per degree difference in temperature and are said to be very poor heat conductors.

In the operation of the apparatus, a heat exchange fluid medium such as steam may be delivered by a tube 20 to one end of each shaft 10 whence it passes through the sleeve 18 to the passage 9 in the associated blade 8 and is discharged from the opposite end of the blade through the other sleeve 18 and tube 20. The flow of stream through the blades 8 will heat the latter and such heat will be transferred to the substances being mixed during the mixing process. The sleeves 18 will insulate the shafts 10 from the steam and consequently will protect the bearings 14 and the packing 16 from the heat of the steam.

By providing thermally insulating sleeves for the full length of each shaft 10, as is illustrated in the drawings, thermal conductivity from the shaft to the housing and to other parts of the apparatus is minimized, thereby improving the thermal efficiency of the mixing process.

The use of a thermal insulating sleeve between the heating medium and the shaft enables the shaft to operate at a much lower temperature than it would if no insulating sleeve were employed, and it also enables the bearings to operate at such a temperature as to permit the use of ordinary lubricating grease without frequent maintenance and without risking the possibility of bearing burn-out. Thus, it not only is possible to use ordinary bearings and packings in the disclosed construction but it also is possible to effect a major saving in bearing and packing maintenance or replacement costs.

*Example*

A twelve hour test was run in a size 16 Baker Perkins sigma blade mixer of the type shown with a 3/16" wall Teflon sleeve insulating three of the four blade axles. Steam supplied at 150 p.s.i. through the blades produced a temperature of 340° F. in the unsleeved axle but only 220° F. in the sleeved axles. Bearing temperatures at the sleeved axles were only 165° F. as opposed to 250° F. at the unsleeved axle. The test showed that grease lubricated axles could be used safely only if the Teflon sleeves were inserted.

Generally speaking the sleeve 18 must be capable of withstanding temperatures up to 500° F. since hot liquids of this temperature are sometimes circulated through such mixer blades. It must be of such thickness as to maintain the bearing at a temperature less than 225° F. which is the maximum for use of greases in the bearings as lubricants. Where lower temperatures are used another plastic possibility for the sleeve is polytrifluorochloroethylene, known commercially as Kel-F.

Use of apparatus of the character disclosed permits a coolant such as cold water or a refrigerant to be circulated through the blades without risking condensation of moisture within the bearing or packing housings. The insulating sleeve functions in exactly the same manner as it does when a heating fluid is circulated through the blades. That is, the sleeve substantially prevents the transfer of heat between the bearings, packings and the shafts or axles.

The disclosed embodiment is representative of a presently preferred form of the invention, but is intended to be illustrative rather than definitive thereof. The invention is defined in the claims.

What is claimed is:

1. In combination: a bearing; a shaft extending through said bearing and having an axial bore therein through which a heat exchange fluid may flow, said bore having a maximum diameter portion in the zone of said bearing and having a diameter portion smaller than the maximum and forming with the latter a shoulder spaced from the zone of said bearing; and a sleeve of uniform wall thickness formed of thermal insulating material accommodated in the maximum diameter portion of the said bore and having one end abutting said shoulder, said sleeve having an axial length such as to extend from said shoulder through the zone of said bearing, said sleeve having an outside diameter corresponding to the maximum diameter portion of said bore and having its outer periphery in engagement with said bore portion over the full length of said sleeve, said sleeve having an axial bore therein of a diameter corresponding substantially to the smaller diameter portion of said shaft bore.

2. The construction set forth in claim 1 wherein said sleeve is formed from a thermosetting resin capable of withstanding temperatures up to 500° F.

3. The construction set forth in claim 2 wherein said resin is polytetrafluoroethylene.

4. In combination: a mixer housing having bearings in opposite walls thereof; a rotary shaft having a bore and having axial end portions extending through said bearings, the end portions having generally axial bore portions connected by an intermediate bore portion in said shaft, through which a heat exchange fluid may flow; said shaft having mixer members thereon between said end portions, accommodated in said housing; said shaft having a radial wall extending crosswise of one of said axial bore portions in the said end portions and spaced axially inwardly from the zone of at least one of said bearings; and a generally cylindrical sleeve of substantially uniform wall thickness throughout its length, formed of thermal insulating material and accommodated in said one of said bore portions to rotate with said shaft, having one end abutting said radial wall; said sleeve having an axial length such as to extend from said radial wall through the zone of said bearing, and being open to a bore portion axially inwardly of the zone of said bearing; said sleeve having an outside diameter corresponding substantially to the diameter of said one bore portion and having its outer periphery in substantial engagement with said one bore portion over the full length of said sleeve.

References Cited by the Examiner

UNITED STATES PATENTS

| | | | |
|---|---|---|---|
| 504,099 | 8/93 | Wiesebrock | 165—92 |
| 863,187 | 8/07 | Kirk | 165—92 |
| 1,036,628 | 8/12 | Humphreys | 165—92 |
| 1,787,263 | 12/30 | Roder | 308—76 |
| 2,225,615 | 12/40 | Bay | 165—133 |

OTHER REFERENCES

Modern Plastics Encyclopedia, published September 1961, volume 39; Article by H. J. Hahn III relied on, "FEP-Fluorocarbon Resin" on page 202.

ROBERT A. O'LEARY, *Primary Examiner.*

CHARLES SUKALO, *Examiner.*